Nov. 2, 1943.          B. B. TALLEY          2,333,129
                    MAP PLOTTING DEVICE
             Filed Nov. 19, 1941       3 Sheets-Sheet 1
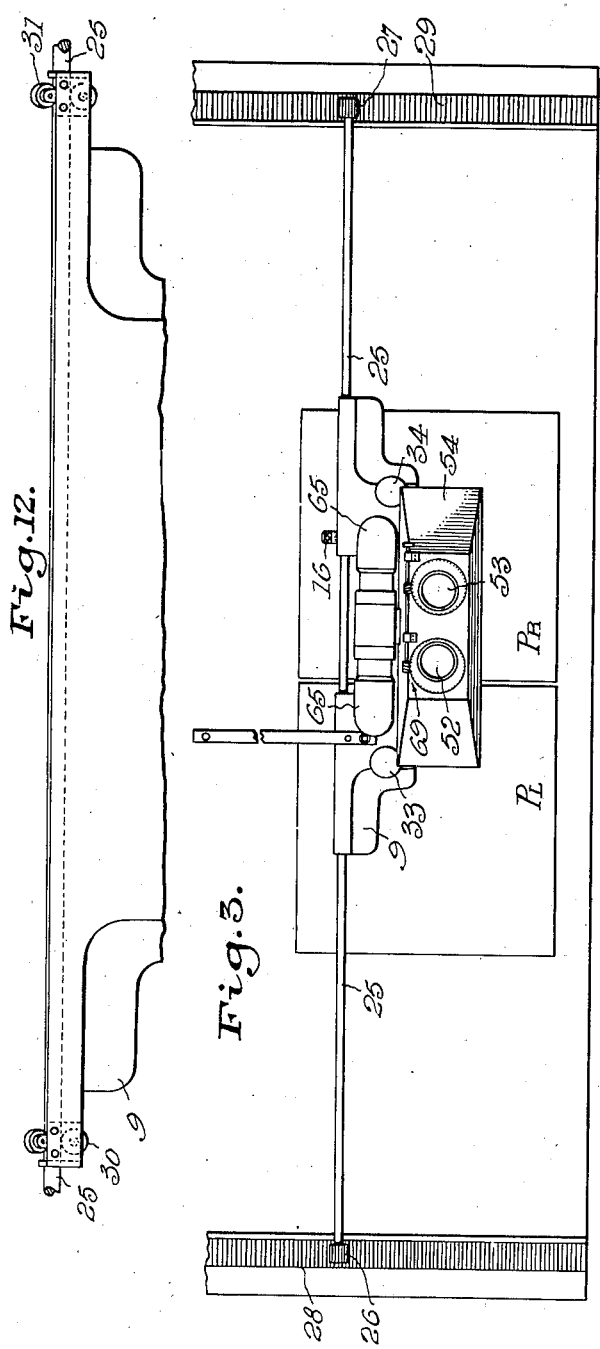
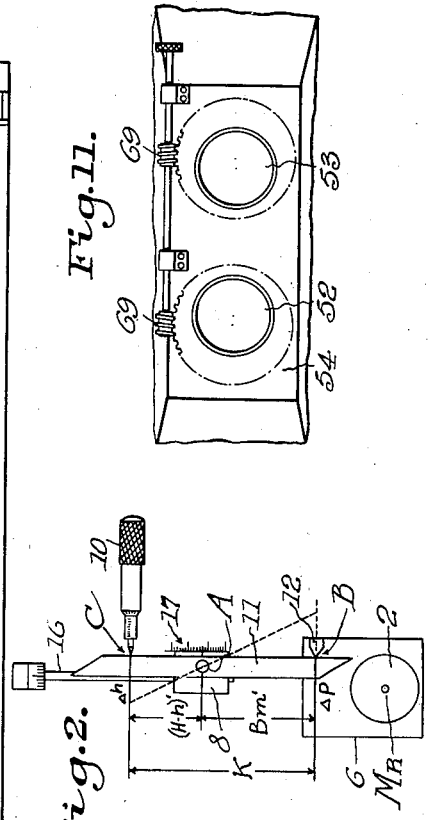
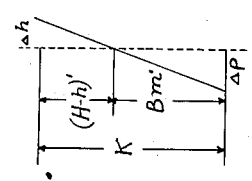
Inventor
Benjamin B. Talley
By Francis H. Vanderwerf
   Joseph N. Crews
                Attorneys

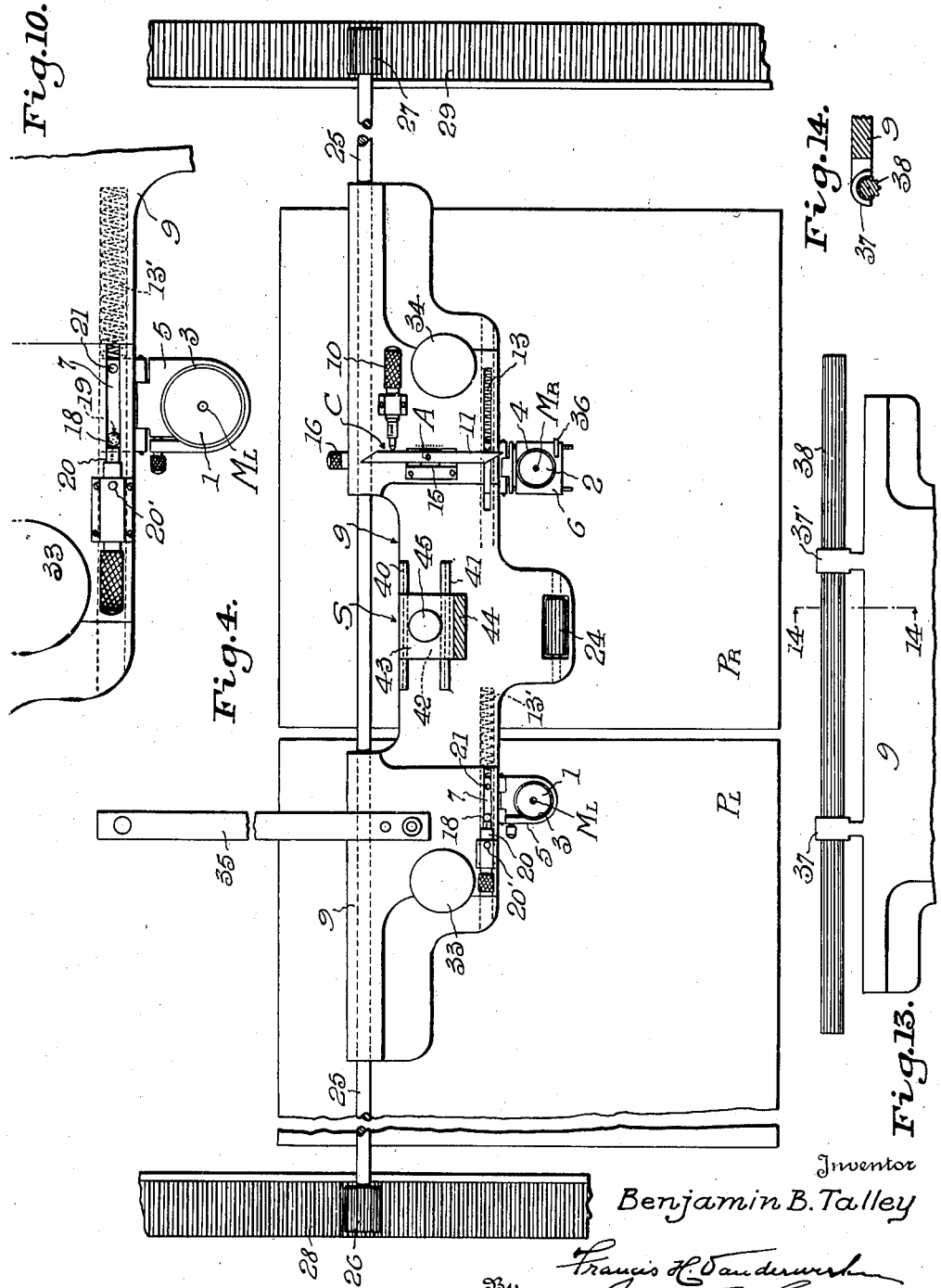

Nov. 2, 1943.        B. B. TALLEY        2,333,129
MAP PLOTTING DEVICE
Filed Nov. 19, 1941        3 Sheets-Sheet 3
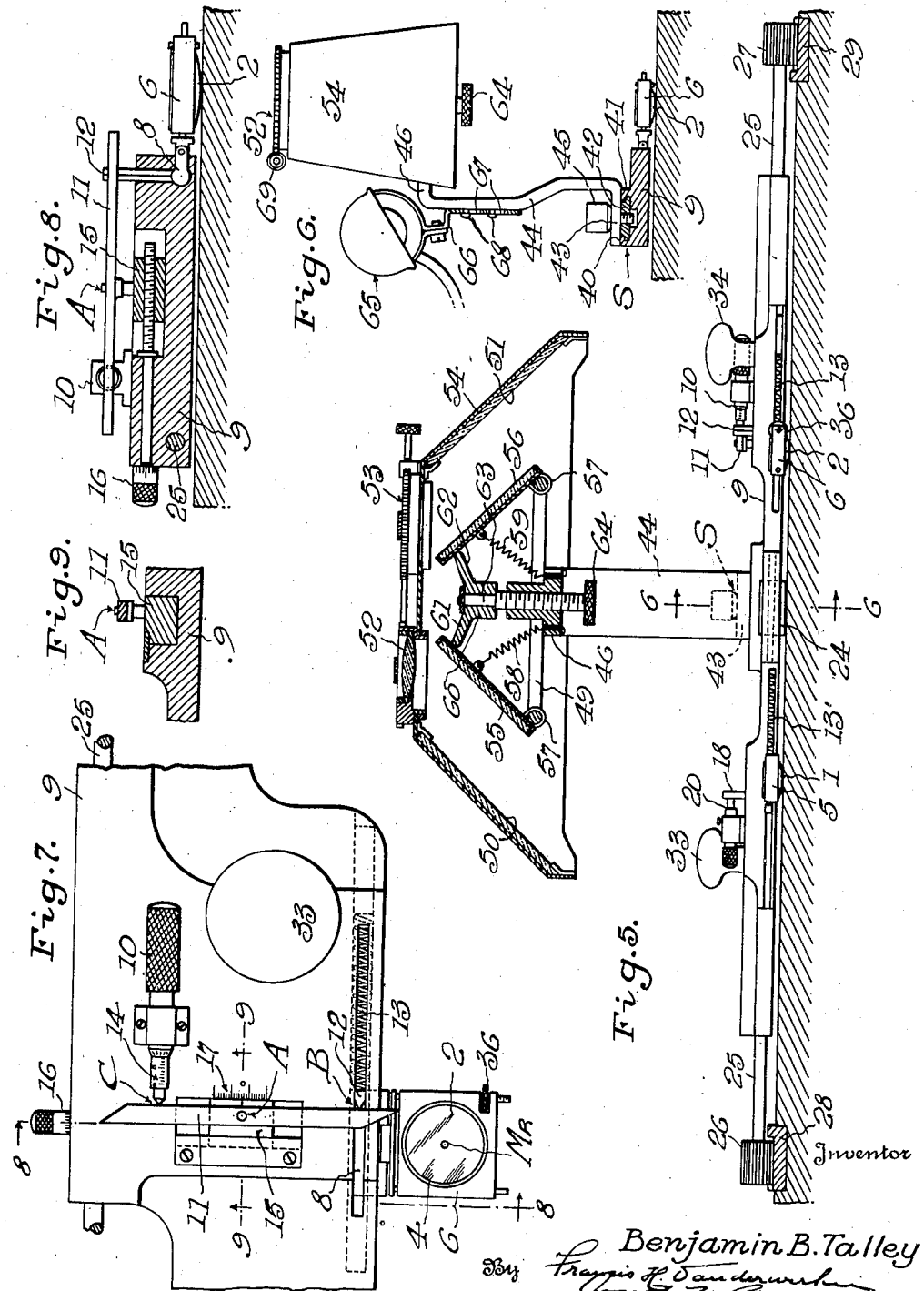
Inventor
Benjamin B. Talley
By
Attorneys Patented Nov. 2, 1943

2,333,129

UNITED STATES PATENT OFFICE 2,333,129

MAP PLOTTING DEVICE

Benjamin B. Talley, United States Army

Application November 19, 1941, Serial No. 419,743

5 Claims. (Cl. 33—20)

(Granted under the act of March 3, 1883, as amended April 30, 1928; 370 O. G. 757)

This invention described herein may be manufactured and used by or for the Government for governmental purposes, without the payment to me of any royalty thereon.

This invention relates to an improved apparatus for plotting maps from photographs and a method of mapping therewith. It has particular reference to an improved type of instrument making use of the parallax principle of measurement for the determination of heights of objects by means of stereoscopic observation of overlapping vertical aerial photographs or oblique photographs restituted to the vertical. It possesses marked improvements and advantages over existing instruments of this general nature, among which specific reference is made to the plotting device and method of mapping for which United States Patent No. 2,104,778 was granted to the undersigned petitioner under date of January 11, 1938, which improvements and advantages are explained in the following description.

The plotting device covered by United States Patent No. 2,104,778, commonly known as the stereocomparagraph, operates to determine differences in elevation of ground points represented on vertical aerial photographs or oblique aerial photographs, in terms of parallax difference according to the following equation.

$$\Delta p = \frac{B_m \Delta h}{H-h} \qquad (1)$$

where:

$\Delta p$=increment of parallax in millimeters corresponding to $h$.
$\Delta h$=elevation difference, usually the contour interval, but always small compared to $H$.
$H$=flight altitude in feet above sea level from which the photographs are taken.
$h$=elevation in feet above sea level of contour or point concerned.
$B_m$=mean measured stereoscopic base of the photographs in millimeters.

In the plotting device for which United States Patent No. 2,104,778 was granted, parallax difference is measured directly by means of a micrometer and the difference between two micrometer readings ($\Delta p$) corresponds to the difference in elevation ($\Delta h$) of the points concerned.

By means of an arrangement hereafter explained, the difference in parallax corresponding to elevation differences between points in overlapping vertical aerial photographs or oblique aerial photographs restituted to the vertical, may be mechanically converted into feet difference in elevation, and such elevations, or differences thereof, in feet, set off directly on the instrument without resort to parallax tables, or the necessity of computing the parallax as heretofore indicated.

By dividing Equation 1 by $\Delta h$, it takes the form $$\frac{\Delta p}{\Delta h} = \frac{B_m}{(H-h)} \qquad (2)$$

where:

$p$=parallax difference in feet.
$h$=elevation difference in feet.
$B_m$=means measured stereoscopic base in feet at the scale of the photograph.
$H$=flight altitude in feet above sea level, reduced to the scale of the photograph.
$h$=elevation in feet above sea level of the point concerned.

For a more complete understanding of the invention reference may be had to the accompanying drawings, in which:

Fig. 1 is a graphical representation of Equation 2 in which prime values are substituted for certain elements in order to resolve them to the physical dimensions of the mechanical apparatus as herein described;

Fig. 2 is a diagrammatic view of the measuring device showing micrometer screws and scales;

Fig. 3 is a plan view of the instrument as operatively connected to a plotting board;

Fig. 4 is a top plan view of the base of the instrument with the stereoscopic viewing device omitted;

Fig. 5 is a front elevation of the instrument showing the stereoscopic device partially sectionized;

Fig. 6 is a transverse section as seen along the line 6—6 of Fig. 5, the stereoscopic device being shown in elevation;

Fig. 7 is a fragmentary plan view of a portion of the base showing the measuring device;

Fig. 8 is a section on the line 8—8 of Fig. 7;

Fig. 9 is a section taken on the line 9—9 of Fig. 7.

Fig. 10 is a fragmentary plan view of a section of the base showing the index marker at the left of the instrument;

Fig. 11 is a fragmentary plan view of the stereoscopic viewing device showing the adjustable eyepiece;

Fig. 12 is a fragmentary plan view showing a modified form of carriage mounting;

Fig. 13 is a fragmentary plan view showing a further modified form of carriage mounting; and Fig. 14 is a sectionized view taken on the line 14—14 of Fig. 13.

Referring to Figure 1:

$$K = (H-h)' + B_m' = \text{a constant} \quad (3)$$

and $$\frac{\Delta p}{\Delta h} = \frac{\Delta p'}{\Delta h'} = \frac{B_m}{(H-h)} = \frac{B_m'}{(H-h)'}$$

or, $$B_m(H-h)' = B_m'(H-h)$$

and $$B_m(H-h)' - B_m'(H-h) = 0 \quad (4)$$

from (3)

$$B_m' = K - (H-h)' \quad (5)$$

Substituting value of $B_m'$ from (5) in (4)

$$B_m(H-h)' - [K-(H-h)'](H-h) = 0$$

and $$B_m(H-h)' - K(H-h) + (H-h)'(H-h) = 0$$

from which $$(H-h)' = \frac{K(H-h)}{B_m + (H-h)} \quad (6)$$

Figure 1 may be expressed mechanically by such an arrangement as shown in Fig. 2 wherein lever 11 is pivoted at a movable pivot A and at point C is a micrometer 10 whereon may be set values of $\Delta h$.

When, therefore, pivot A is set at a distance $(H-h)'$ from the contact point C of the micrometer the movement of point B and the connected index $M_r$ due to movement $\Delta h'$ of micrometer 10 will correspond to the correct parallax value $\Delta p$ from the basic parallax Equation 1.

The relative physical values of the quantities expressed in the foregoing general equations are obtained by substituting real values corresponding to the conditions under which the photographs are taken.

To establish such a relationship, let it be assumed that in a mechanical adaptation of Fig. 2 that K is fixed at 0.30 foot, and that it is desired to determine differences in elevation by means of parallax measurement on 18" x 18" photographs taken at 20,000 feet altitude (above the ground) with 60% overlap in the direction of flight.

The scale of the photographs is 1/20,000.

$$B_m' = (1-.60) \times 1.5 = 0.60 \text{ foot}$$

$$(H-h)' = 20,000 \times \frac{1}{20,000} \text{ feet}$$

Substituting these values in Equation 6

$$(H-h)' = \frac{0.30 \times 20,000/20,000}{0.60 + 20,000/20,000} = 0.30/1.60$$

$$= 0.1931 \text{ ft.}$$

and $$B_m' = K - (H-h)' = 0.30 - 0.1931 = 0.1069 \text{ ft.}$$

If, also, micrometer 10 is calibrated in tenths, hundredths and thousandths of feet, the difference between two readings of the micrometer when the floating mark is alternately fused on two points in the spatial model, corresponds to values of $\Delta h$, ($\Delta h$ to remain small) and when multiplied by the scale of the photograph, corresponds to true elevation differences on the photographs considered.

In contouring the area of overlap of the photographs (when the value of $(H-h)'$ has been determined) the values of the contours may be set on the micrometer, and the fused floating mark brought into contact with the stereoscopic model and the procedure of contouring commenced.

For a more complete explanation of what is involved in the mechanical adaptation of this principle, and for a further explanation of the method of mapping therewith, reference is had to Figure 4 wherein is a more detailed explanation of the device.

For convenience in fabrication, certain parts of the plotting device herein described are considered to be interchangeable with similar parts in the plotting device covered by United States Patent No. 2,104,778, granted to the undersigned petitioner under date of January 11, 1938.

The measuring system of the present device consists of index marks $M_L$ and $M_R$ scribed in concave index mark lenses 1 and 2 carried in lens retaining rings, 3 and 4 fitted into lens retaining ring mounts 5 and 6 which are by means of a hinge arrangement attached to slides 7 and 8 in carriage 9. By means of a combination of spring and screw action, later to be explained, index marks $M_L$ and $M_R$ may be made to move closer together or farther apart along a fixed straight line to effect coincidence with the image points of identical objects appearing on two overlapping vertical aerial photographs $P_L$ and $P_R$ properly oriented beneath the device for stereoscopic observation through a suitable stereoscopic observing system mounted at point S on carriage or base 9. Provision is had for mounting a suitable stereoscopic observing system at point S, which may be similar to that shown in Patent No. 2,104,778.

When observation is had through a suitable stereoscopic observing system of two properly oriented photographs, index marks $M_L$ and $M_R$ when brought into coincidence with the images of identical objects become fused into a single "floating mark" resting on the spatial model so obtained of the landscape. To effect a continuous coincidence between the "floating mark" and the spatial model as the entire area of overlap of the photographs is scanned, it is necessary to move index marks $M_L$ and $M_R$ in and out along a line parallel to the stereoscopic base. The extent of this movement is a measure of the relief of the spatial model and may be expressed in terms of differences in elevation between points in the landscape.

As heretofore indicated, the conventional expression of these elevation differences is in terms of the parallax equation wherein parallax is measured in millimeters and converted into feet difference in elevation by resort to tables. An advantage of this invention is the means for direct expression of such elevations and differences thereof directly in feet. The means for such expression as heretofore schematically explained is obtained by actuating the movement of index mark $M_R$, not by direct movement as in United States Patent No. 2,104,778, and other devices of a similar nature, but as shown in Fig. 4, by means of a driving micrometer 10 which throughout its range indicates a continuing solution of Equation 2 in terms of $\Delta h$. Such a realization is obtained in actuality by means of micrometer 10 exerting a driving force at point C on pivoted lever 11 which is transmitted through said lever and pivot A to point B where it is brought to bear against a vertical projecting arm 12 attached to slide 8 and thence connected to index mark $M_R$.

The projecting arm of slide 8 is maintained in contact with lever 11 by pressure exerted by spiral spring 13.

When the "floating mark" is thus maintained in contact with the spatial model by means of a movement of index mark $M_R$ by driving micrometer 10, the feet difference in elevation between points on the landscape is indicated directly on a properly graduated scale 14 of micrometer 10 whose direction of movement is parallel to that of $M_R$, which is to say, to the stereoscopic base.

To always obtain such an indication of elevation difference in feet on scale 14 it is necessary to shift pivot A along a line normal to the direction of movement of micrometer 10 and index mark $M_R$ without disturbing their constant distance of separation K (see Fig. 2).

Pivot A is provided by a post rising from pivot block 15, Figs. 4 and 7, mounted in carriage 9 and fitted in a bearing within lever 11, and the movement of pivot A is effectively accomplished by means of a decimally and centicimally scribed screw head 16, threaded into pivot block 15 and held from longitudinal sliding in carriage 9. One turn of screw head 16 suffices to move pivot A and its zero of index one graduation along scale 17, thereby accomplishing means for indicating the correct position for establishing the position of pivot A.

The theoretical explanation heretofore given shows how differences in elevation between points in overlapping essentially vertical aerial photographs may be obtained directly in feet difference in elevation on micrometer scale 14. It is practically realized by scribing scale 14 in feet at the selected scale, say $1/20,000$, wherewith the span of graduations necessary to measure a difference of elevation of 1000 feet would extend a distance of $1000/20,000$, or $1/20$-foot and a scale to measure 2000 feet would be $1/10$-foot long, which are reasonable lengths, although the application of this device is not limited to the lengths of scales thus indicated, but is applicable also to scales of other lengths and degrees of fineness.

For the purpose of this explanation, let it be assumed that the zero graduation of scale 14 is at some convenient point near the left end of micrometer 10 and that the graduations increase to the right in increments of $1/200$ foot (corresponding to 100 feet at scale $1/20,000$) and the thimble thereof be centicimally graduated wherewith the limit of direct reading of the scale would then correspond to a difference of elevation of 1-foot.

For the scale 14 to indicate feet above sea level of points in the spatial model it is necessary that the position of the floating mark when in contact with a point of given elevation be such that it will always effect a corresponding reading on the said scale 14. This may be accomplished by properly spacing photographs $P_L$ and $P_R$ however, it may also be simply accomplished by means of an ancillary motion of the left index mark $M_L$ attached to slide 7 wherein may be compensated the necessary motion, or shifting, of the left index mark $M_L$ to permit the indicated reading of scale 14 to be brought to the proper zero of reference, or datum. By such a system the indicated readings of scale 14 may be made to correspond to feet above sea level, within the range of the scale, say 1000 ft. or 2000 ft., or other limit, as the case may be, beyond which point the readings of scale 14 will correspond to elevations above such datum plane above sea level as the range of the scale 14 and the setting of the left index mark $M_L$ may indicate.

To accomplish the aforestated purpose of always causing scale 14 to indicate feet above sea level of the points concerned, a pin 18 fits into a suitable hole 19 in slide 7 and impinges against ancillary micrometer screw 20 mounted on carriage 9 and exerts a force to the right against a spring 13' in a direction parallel to the stereoscopic base. Ancillary micrometer 20 is for convenience graduated in the same values as micrometer 10. Such readings, however, will be of arbitrary value and are suitable only for affecting the zero of micrometer 10 and for offsetting parallax due to small values of tip and tilt. Ancillary micrometer 20 is provided with a lock which consists of a set screw 20' to insure retention of an established setting.

By means of a second hole 21 spaced in and at a distance equal to the total range of graduation of the micrometer to the right of hole 19 in slide 7, provided to receive the pin 18, the range of measurement of elevations may thereby be increased by 1000 ft., 2000 ft. or other suitable distance, it being necessary in the operation of the device to add this value to the indicated reading of scale 10.

As presumed from the foregoing explanation, it is necessary in the successful operation of the device that the imaginary line between $M_L$ and $M_R$ be always parallel to the stereoscopic base of the photographs. This may be obtained by a variety of ways, only three of which are described herein, although the means of providing for such constancy is not limited to the means herein described.

Carriage 9 is partially supported near the center of its leading edge by a splined roller 24 and at the back may be drilled with a longitudinal hole through which may be fitted bearing rod 25, which together with splined roller 24 supports the carriage off the photographs, and along which the carriage is free to slide from left to right. On the two ends of bearing rod 25 are fitted and keyed suitable gears 26 and 27 which are free to roll in suitable racks 28 and 29, which in turn are fixed to the supporting drawing board. Thus, by rotation of bearing rod 25 the carriage may be moved forward and backwards, which action, when combined with the sliding action on the bearing rod 25 permits movement anywhere within the horizontal plane of the photographs.

Carriage 9 may be partially supported near its front edge by splined roller 24, and its rear edge instead of being bored and fitted with bearing rod or shaft 25 may be attached to two left and right self-aligning roller assemblies 30 and 31 which are free to roll along rod 25. They may in turn, be fitted at the ends with gears 26 and 27 adapted to roll in racks 28 and 29, which for convenience are mounted on a supporting drawing board, or the shaft 25 may have rollers mounted at the ends thereof. Another method of providing for constancy of alignment, or parallelism of the device is to support the front thereof by means of splined roller 24 and at the back thereof instead of a support of a type heretofore indicated the carriage 9 may be supported through suitable bearings 37 and 37' mounted upon a single splined roller 38 which may be approximately the length of the carriage to which the bearings are attached. The rollers 38 and 24 roll on the photographs $P_L$ and $P_R$ as they are scanned. Thus supported, the carriage is off the photographs but being fixed in hinged mounts, lenses 1 and 2 and the index marks M$_L$ and M$_R$ bear on the photographs due to their own weight.

To afford a means of moving the device about over the photographs to effect scanning of the entire area of overlap, guiding knobs 33 and 34 of convenient size to fit the hands of the operator are provided and mounted on the carriage.

Heretofore, provision for the measurement of elevations alone has been indicated. It being desirable to plot such elevations either as spot heights, form lines, or contours provision is had in pencil arm or scriber 35 for mounting a drawing pencil of the same nature as in the device covered by United States Patent No. 2,104,778.

It being realized that photographs will rarely be truly vertical, but that residual tips and tilts may likely be encountered, provision is had in "by" motion screw 36 to provide means for obtaining freedom from parallax in the fusion of floating mark M$_L$ and M$_R$.

A stereoscopic observing system is mounted at point S of the carriage 9 which consist of a magnifying mirror stereoscope having the following general characteristics, which characteristics are not the limiting characteristics, as the device is adaptable to other observing systems.

The stereoscopic observing system may be of similar design to that shown in Patent No. 2,104,778. To provide for the attachment of this device track members 40 and 41 are fastened to the base or carriage 9 for the reception of a slide 42 to which is secured the lower angular arm 43 of bracket 44. Slide 42 and consequently bracket 44 are adapted to be locked in any desired position by means of locking screw 45.

Fixed to the upper angular arm 46 of bracket 44 is a rectangular frame 47 supporting a stereoscope comprising angle mirrors 50 and 51, and eyepieces 52 and 53 supported by hood 54 in any suitable manner. Cooperating respectively with mirrors 50 and 51 are mirrors 55 and 56 adjustably mounted on frame 47 by pivot clips 57. Near the opposite ends of mirrors 55 and 56 are attached springs 58 and 59, their other ends being fastened to the bracket 44. In this manner the mirrors are held against the arms 61 and 62, of member 60 carried by stud 63 threaded through bracket 44 and having a knob 64. By adjusting member 60 by turning knob 64 the angular disposition of mirrors 55 and 56 may be adjusted to suit the individual operator.

An illuminating device 65 is also supported on the bracket 44 by a clip 66 to provide sufficient and uniform illumination of the photographs. The clip 66 is provided with bayonet type slots 67 adapted to engage bayonet pins 68 on the bracket 44. In this manner the illuminating system may be readily attached or removed.

The magnifying unit is fastened to the hood and contains two eyepieces 52 and 53 which can be rotated by worm gearing 69 to accommodate eye separations of various individuals. When magnification is not necessary, the unit can be swung out of the way. These eyepieces may contain lenses of a suitable magnifying power. The stereoscope unit can be readily attached or removed from the frame.

Having described my invention what I claim as new and wish to secure by Letters Patent is:

1. In an apparatus for plotting maps from a pair of aerial photographs arranged with a common stereoscopic base line and including a pair of relatively adjustable index marks determining a straight line parallel with said base line, a micrometrically adjustable measuring device coacting with one of said marks for effecting its adjustment relative to the other of said marks along said straight line in accordance with the parallax difference between points of different elevations on said photographs, said device including a micrometer screw, a carrier for said mark, and means for transmitting the movement of the micrometer screw to said carrier, said means being adjustable along a path normal to the base line whereby the adjusted position of the index mark will be indicated by the micrometer screw in terms of feet.

2. In an apparatus for plotting maps from a pair of aerial photographs arranged with a common stereoscopic base line and including a pair of relatively adjustable index marks determining a straight line parallel with said base line, a micrometrically adjustable measuring device coacting with one of said marks for effecting its adjustment relative to the other of said marks along said straight line in accordance with the parallax difference between points of different elevations on said photographs, said device including a slidable carrier for said marks, a micrometer screw, means pivotally mounted between the micrometer screw and carrier for transmitting the movement of the former to the latter, the pivotal mounting of said means being adjustable normal to the path of movement of said carrier, and means in connection with said micrometer screw for indicating the adjusted position of said mark in terms of feet.

3. In an apparatus for plotting maps from a pair of aerial photographs arranged with a common stereoscopic base line and including a pair of relatively adjustable index marks determining a straight line parallel with said base line, a micrometrically adjustable measuring device cooperating with one of said marks for effecting its adjustment relative to the other of said marks along said straight line in accordance with the parallax difference between points of different elevations on said photographs, said device including a slidable carrier for said mark, a micrometer screw movable parallel with said base line, a lever pivoted between said micrometer screw and carrier for transmitting the movement of the former to the latter, and manually controlled means in connection with the pivotal point of said lever, said means being adjustable in a plane normal to said base line whereby said screw will indicate the adjusted position of said index mark in terms of feet.

4. In an apparatus for plotting maps from a pair of aerial photographs arranged with a common stereoscopic base line and including a pair of relatively adjustable index marks determining a straight line parallel with said base line, a micrometrically adjustable measuring device coacting with one of said marks for indicating its adjusted position relative to the other of said marks along said straight line in accordance with the parallax difference between points of different elevations on said photographs, said device including a slidable carrier for said mark, a micrometer screw spaced from said carrier and movable parallel with said base line, a lever pivoted between said micrometer screw and carrier and positioned to transmit the movement of the micrometer screw to said carrier, and means in connection with the pivotal point of said lever for adjusting said point along a path normal to the path of movement of said carrier whereby the micrometer screw will indicate the adjusted position of said mark in terms of feet.

5. In an apparatus for plotting maps from a pair of aerial photographs arranged with a common stereoscopic base line and including a pair of relatively adjustable index marks determining a straight line parallel with said straight line, a micrometrically adjustable measuring device coacting with one of said marks for indicating its adjusted position relative to the other of said marks along said straight line in accordance with the parallax difference between points of different elevations on said photographs, said device including a carrier for said mark slidable along a path parallel with said straight line, a micrometer screw adjustable along a path parallel with but vertically spaced from that of said carrier, a lever pivotally supported between said micrometer screw and said carrier for transmitting the adjustment of the former to the latter, and means for manually adjusting the pivotal support of said lever along a path normal to the paths of movement of said micrometer screw and carrier whereby the adjusted position of said mark along said straight line will be indicated by the micrometer screw in terms of feet.

BENJAMIN B. TALLEY.